United States Patent
Wang et al.

(10) Patent No.: US 11,582,091 B2
(45) Date of Patent: *Feb. 14, 2023

(54) PROVISIONING NETWORK DEVICES USING A VENDOR-NEUTRAL PLATFORM

(71) Applicant: salesforce.com, inc., San Francisco, CA (US)

(72) Inventors: Chi Wang, Redmond, WA (US); Edet Nkposong, Mercer Island, WA (US); Sergey Pastukhov, Sammamish, WA (US); Roman Sharygin, Issaquah, WA (US); Mehmet Bilgi, Mill Creek, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,799

(22) Filed: Oct. 13, 2020

(65) Prior Publication Data

US 2021/0119862 A1  Apr. 22, 2021

Related U.S. Application Data

(63) Continuation of application No. 15/885,531, filed on Jan. 31, 2018, now Pat. No. 10,805,153.

(51) Int. Cl.
*H04L 41/0806* (2022.01)
*G06F 8/65* (2018.01)
(Continued)

(52) U.S. Cl.
CPC ........... *H04L 41/0806* (2013.01); *G06F 8/65* (2013.01); *H04L 41/0843* (2013.01); *H04L 41/12* (2013.01); *H04L 67/34* (2013.01)

(58) Field of Classification Search
CPC . H04L 41/0806; H04L 41/0843; H04L 41/12; H04L 67/34; G06F 8/65
(Continued)

(56) References Cited

U.S. PATENT DOCUMENTS 8,041,786 B2 * 10/2011 Tindal ................. H04L 41/0893
709/224
2002/0069274 A1   6/2002 Tindal et al.
(Continued)

FOREIGN PATENT DOCUMENTS

WO   2007136863 A2   11/2007

OTHER PUBLICATIONS

United States Patent and Trademark Office, U.S. Appl. No. 15/885,531, Non-Final Office Action dated Dec. 26, 2019.
(Continued)

*Primary Examiner* — Zi Ye
(74) *Attorney, Agent, or Firm* — Wong & Rees LLP; Kirk D. Wong

(57) ABSTRACT

Network devices are provisioned using a single vendor-neutral data model with a non-relational database. Provisioning requirements are collected upon detecting a new network device that needs to be configured and/or installed. Based on the provisioning requirements, a configuration object is retrieved using a data model in the non-relational database. The configuration object is transformed to a concrete configuration file for the network device. After applying the configuration file to the network device, a separate process validates the configuration of the network device by comparing the observed network configuration with the initial target configuration data included in the configuration object.

20 Claims, 5 Drawing Sheets

(51) Int. Cl.
  *H04L 41/084*  (2022.01)
  *H04L 67/00*  (2022.01)
  *H04L 41/12*  (2022.01)

(58) Field of Classification Search
  USPC .......................................................... 709/222
  See application file for complete search history.

(56) References Cited

U.S. PATENT DOCUMENTS

| | | | | |
|---|---|---|---|---|
| 2002/0191619 | A1* | 12/2002 | Shafer | H04L 45/00 370/352 |
| 2003/0135596 | A1* | 7/2003 | Moyer | H04L 41/022 709/223 |
| 2003/0217358 | A1* | 11/2003 | Thurston | G06F 8/60 717/174 |
| 2005/0044265 | A1* | 2/2005 | Vinel | H04L 41/0806 709/245 |
| 2006/0242690 | A1 | 10/2006 | Wolf et al. | |
| 2006/0250982 | A1 | 11/2006 | Yuan et al. | |
| 2011/0196946 | A1* | 8/2011 | Manchester | H04W 12/041 709/220 |
| 2014/0022939 | A1* | 1/2014 | Apte | H04L 41/0806 370/254 |
| 2019/0238403 | A1 | 8/2019 | Wang et al. | |

OTHER PUBLICATIONS

United States Patent and Trademark Office, U.S. Appl. No. 15/885,531, Notice of Allowance dated Jun. 10, 2020.

\* cited by examiner

PROVISIONING NETWORK DEVICES USING A VENDOR-NEUTRAL PLATFORM

PRIORITY CLAIM

This application claims the benefit as a Continuation of U.S. application Ser. No. 15/885,531, filed Jan. 31, 2018, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to cloud-computing infrastructure, and in particular, to a vendor-neutral platform for provisioning networking devices.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

Architecturally, the large-scale cloud-based computer system may rely on a multitenant architecture that employs an ever-changing infrastructure of servers, networking devices, and other devices within datacenters. Any client-server architecture that employs thousands of servers to deliver interactive user experiences through the Internet may rely on a complex set of datacenters, networking devices, and computing systems to deliver their product. To ensure servers are accessible from outside of a datacenter, even when networking devices fail, quick installation and provisioning of new networking devices is paramount to running the datacenter.

Even through close and intensive human supervision from experts experienced in various aspects relating to configuring network devices, it becomes unmanageable very quickly as a datacenter grows and provisioning requirement complexity grows. Considering the variability and diversity of network devices, routing protocols, configurations, and vendors, a lack of a standard in provisioning and configuring new network devices results in errors, inefficient use of resources, lack of transparency, prolonged downtimes, and organization-wide failures. Significant time and resources is spent on manually provisioning each new network device.

Most of the existing systems use relational databases or files to store configuration files and/or objects for each type of network device, such as a switch. Given a new switch to deploy into an existing architecture, a new schema needs to be defined in the database or a new file structure for that device, and a configuration service may need updating to manage the new switch. Overall, this results in a tedious process that fails to accommodate the exponential growth of datacenters while also increasing the maintenance cost of the configuration service.

Additionally, existing approaches fail to leverage the common parts of different network switches, for example, to simplify the management of configuring new devices. Instead, these approaches treat each type of switch completely differently, even if there are commonalities. Because of this, managing and monitoring different types of switches within one system remains challenging using existing approaches.

Furthermore, validation of a newly configured device is also made more difficult because existing configuration services treat each device separately and differently. Thus, comparison across multiple types of switches, for example, is impossible because no commonalities are available to compare.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
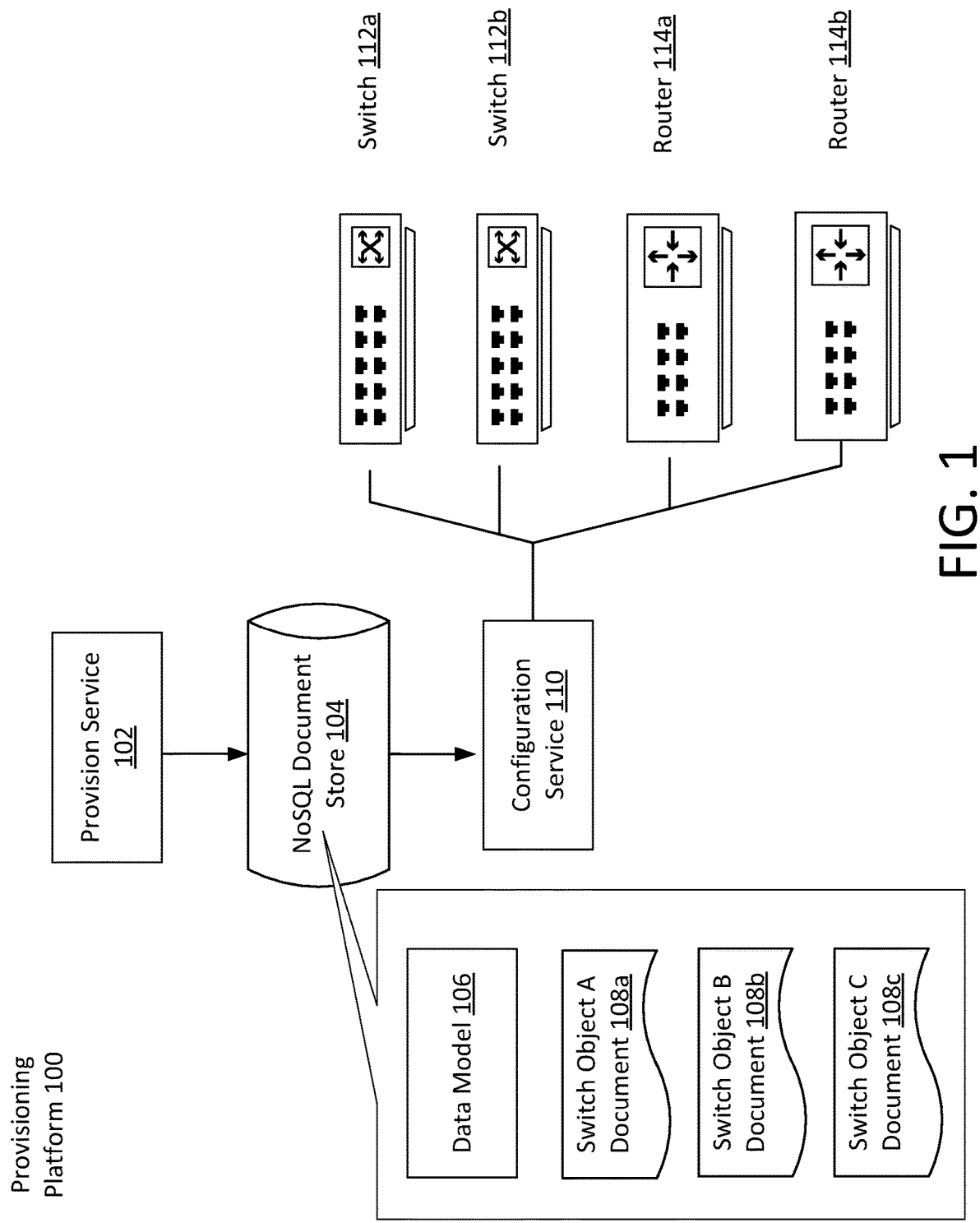
FIG. 1 illustrates an example overall network device provisioning platform.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
3.0. Example Embodiments
4.0 Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used by a network device provisioning platform to configure and/or install networking devices discovered at a datacenter. Vendor-neutral data models based on actual operational needs and requirements from network operators are used to produce a dynamic, programmable infrastructure that adopts software-defined networking principles including declarative configuration and model-driven management and operations. Due to rapid growth of a cloud-based platform, demand for a bigger and faster network requires deployment of newer and faster routers daily and applying management processes to all types of switches.

Considering the complexity of traditional methods of managing thousands of network switches of different physical models, different configurations, and different vendors by using thousands of data models for the different types in a relational database, a new schema is needed to scale with the demands of a faster, bigger, and consequently more complex network.

A vendor-neutral provisioning platform as described herein operates continuously upon receiving an indication of a new network device connected to the network. Provisioning requirements, including internet protocol (IP) & subnet, access control, network traffic control, and the like, are collected from different data sources for the new network device. Provisioning requirements of the device are then encoded to an abstract (one for all) data model as a configuration object (config object) and saved to a NoSQL document database. Provisioning requirements include various characteristics of the device that are used in a specific manner A configuration service, separate from the provision service that performed the two steps above, reads the config object from the database and uses it to render and/or generate one or more configuration files for the device using a defined markup language.

A separate process, such as a discovery service, connects to the new network device through a secure shell protocol (ssh) to retrieve observed network configuration data. The observed configuration data is then compared to the original config file generated to ensure the device is configured as planned.

A platform user, who may be an operator, an administrator, an authorized user, a designated user, etc., for managing network device provisioning, can request a report of configured network devices, for example through a web portal or a web page, from the provisioning platform, in an embodiment.

A cloud computing service may operate by using networked datacenters that comprise various components each of which contains application data and application services. The networked datacenters each comprise racks of infrastructure components that support the cloud-computing service, including physical network devices such as switches, hubs, routers, and fibre channel over ethernet (FCoE) as well as many different types of servers, such as blade servers and bare metal environments, storage devices, and storage area networks (SANs), each with different types of vendors, designs, and configurations.

In an embodiment, one abstract schema is used to model all types of switches and other network devices. A language is defined to transform the abstract schema to a concrete configuration. It is possible to build one service to manage all types of switches, and one service to monitor switches, in an embodiment. In an embodiment, a non-relational database, such as a NoSQL database, is implemented, providing greater flexibility to manage schema changes and service updates.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1 illustrates an example overall network device provisioning platform 100 for provisioning network devices that support a network. Example computing systems that implement the network device provisioning platform (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks.

Networking is one of the most important aspects of running a datacenter. In order to communicate data from servers within a datacenter to clients and/or other computing systems outside of the datacenter, several provisioning requirements, or functional uses of various characteristics of network devices, are addressed, including, but not limited to, assigning internet protocol (IP) and subnet addresses to machines and routers, defining network traffic control rules and announcing routes (e.g., border gateway protocol (BGP), a standardized exterior gateway protocol designed to exchange routing and reachability information among autonomous systems (AS) on the Internet)), defining network cable connection, defining authentication, authorization, and accounting, defining service group network by virtual local area network (VLAN), defining different levels of service access control using access control lists (ACL), etc. Control commands such as these are encapsulated into configuration files that are applied to network devices when they are provisioned or updated. Each network device has a different configuration, with different configuration files and different programmatic code that handles the configuration files.

Due to the variability and diversity of network devices, routing protocols, configurations, and vendors, performing provisioning and/or configuration of network devices as well as validating that the devices are provisioned correctly remain challenging because no standard exists in the art.

As illustrated in FIG. 1, a provision service 102 generates configuration target data objects for any devices using one data model 106. A general vendor-neutral data model 106 is defined with a non-relational document database, or a NoSQL document store 104. Although NoSQL is used herein, it is understood that any non-relational database may be used. By managing physical network switches using this data model 106 in the NoSQL document store 104, configuration management complexity is reduced from thousands to one. Additionally, this model provides high extensibility to adopt any changes, such as a new device, new type, or new vendor. Further, a minor cost on model and/or schema changes is incurred. The NoSQL document database provides flexibility and avoids restraint on future changes in comparison to a traditional SQL (relational type) database. While one drawback of a NoSQL database is data duplication, the gains from reducing configuration management complexity using a universal model for all network devices and the flexibility of adopting changes far outweigh any drawbacks.

FIG. 1 and the other figures use like reference numerals to identify like elements. A letter after a reference numeral, such as "108a," indicates that the text refers specifically to the element having that particular reference numeral. A reference numeral in the text without a following letter, such as "108," refers to any or all of the elements in the figures bearing that reference numeral (e.g. "108" in the text refers to reference numerals "108a," "108b" and/or "108c" in the figures). Only three switch object documents 108 are shown in FIG. 1 in order to simplify and clarify the description.

As illustrated in FIG. 1, the NoSQL document store 104 may include switch object A document 108a, switch object B document 108b, and switch object C document 108c. Each switch object exists as a document encoded with provisioning requirements, or functional use cases of one or more characteristics of the associated device. This enables the one data model 106 to be used in configuring different devices with different config objects with the same schema. Suppose, for example, that a new network device had been detected. Switch 112a, the new network device, is setup with a configuration file based on switch object A document 108a. Another network device, switch 112b, may be discovered to need an update. Accordingly, switch object B document 108b may be transformed by the configuration service 110 to provide one or more configuration files to switch 112b. Other types of devices, such as router 114a and router 114b, may be configured using the same data model 106. Though not pictured, router object documents may be stored in the NoSQL document store 104 based on use cases of various characteristics of routers. Template configurations may exist for different types of network devices, such as switches, hubs, routers, and so on.

The configuration service 110 reads a config object from the database and uses it to render and/or generate a configuration file for the device using a defined markup language. An example line of program code used by the configuration service 110 may include "Convert: "{Template.AAA}.omitempty"". An example configuration file may include a listing of instructions to the network device in a format that is understood by the network device. Because different vendors of network devices may have different formats, the configuration service 110 may interpret a configuration object for a particular vendor to generate instructions in a format specifically for that particular vendor.

An example configuration file for a router may include the following:

```
no feature telnet
feature bgp
feature interface-vlan
feature lldp
feature bfd
feature dhcp
feature scp-server
!
interface loopback0
    ip address {{ _ip4 }}/32
```

-continued

```
    ipv6 address {{ _ip6 }}/128
!
{% include internal_vendor_compliance_dir +
'acl_templates/xxxxxxxxx_snmp_acl.j2' %}
{% include internal_vendor_compliance_dir +
'acl_templates/xxxxxxxxx_vty_acl.j2' %}
{% include internal_vendor_compliance_dir +
'acl_templates/xxxxxxxxx_server_ops_build_acl.j2' %}
{% include internal_vendor_compliance_dir +
'acl_templates/xxxxxxxxx_rack_acl.j2' %}
{% include internal_vendor_compliance_dir +
'master_include.j2' %}
!
system urpf disable
!
username XXX password 5 {{ h }} role network-admin
!
hardware profile tcam region vacl 0
hardware profile tcam region ifacl 0
hardware profile tcam region qos 256
hardware profile tcam region e-vacl 0
hardware profile tcam region e-racl 1024
hardware profile tcam region racl 3072
!
hardware profile portmode XXXXXX
!
hardware qos min-buffer qos-group default
!
int e1/49 - 52
speed 10000
!
int e1/49/1 - 4
no shut
int e1/50/1 - 4
no shut
int e1/51/1 - 4
no shut
int e1/52/1 - 4
no shut
cli alias name wr copy running-config startup-config
cli alias name q exit
```

As shown in the above configuration file, command-line interface style configuration instructions may be formatted for a router. The configuration management may simply be stored in a single data model in the non-relational database. Thus, a general vendor-neutral data model is defined with the latest emerging datastore technology, the non-relational document database.

Figure 2:
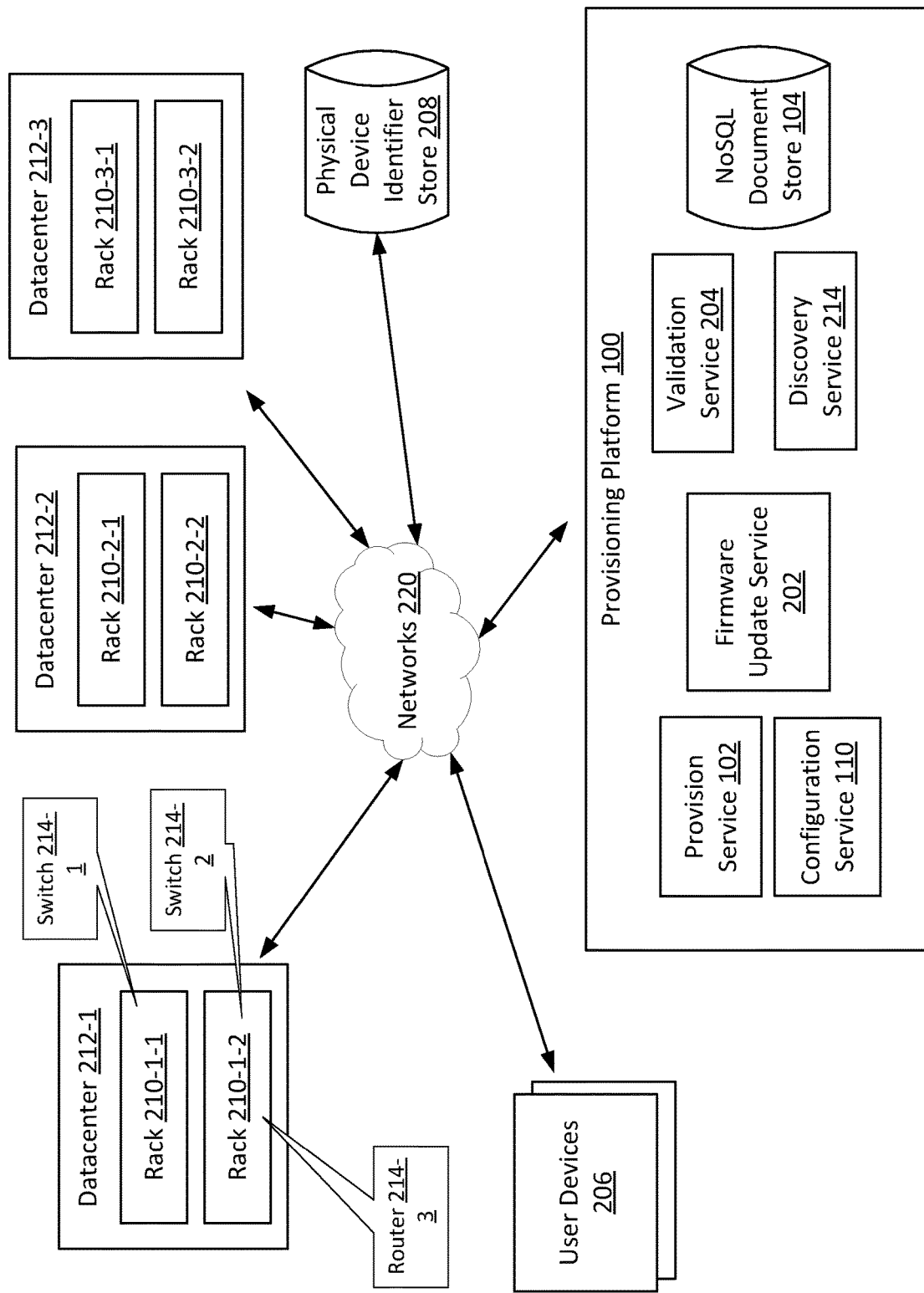
FIG. 2 illustrates an example high-level block diagram, including an example provisioning platform.

FIG. 2 illustrates an example high-level block diagram, including an example provisioning platform 100. In some embodiments, the computing system may comprise a plurality of datacenters such as 212-1, 212-2, 212-3, etc., as illustrated in FIG. 2, which may be located at the same or different geographic locations such as the same or different continents, the same or different countries, the same or different states, the same or different regions, and so forth.

Each datacenter may implement a set of racks in server cabinets that organizes physical devices that support the computing system. The data center rack is a type of physical steel and electronic framework that is designed to house servers, networking devices, cables, and other data center computing equipment. As shown in FIG. 2, each datacenter (e.g., 212-1, 212-2, 212-3, etc.) may comprise a set of one or more racks. A first datacenter 212-1 comprises first racks 210-1-1, 210-1-2, etc.; a second datacenter 212-2 comprises second racks 210-2-1, 210-2-2, etc.; a third datacenter 212-3 comprises third racks 210-3-1, 210-3-2, etc.

Each rack (e.g., 210-1-1, 210-1-2, 210-2-1, 210-2-2, 210-3-1, 210-3-2, etc.) in the hosting computing system can house a number of networking devices, servers, and other computing systems. As illustrated in FIG. 2, the system instance (210-1-1) in the datacenter (212-1) may house a first switch 214-1 and a second switch 214-2, among others; the rack (210-1-2) in the datacenter (212-1) may host a router 214-3, among others.

FIG. 2 illustrates an example provisioning platform 100 that can be used to provide reliable, flexible and scalable provisioning of network devices in the computer system. In some embodiments, provisioning and/or updating of network devices can be performed fully automatically. An example provisioning platform 100 includes a provision service 102, a configuration service 110, a firmware update service 202, a validation service 204, a discovery service 214, and a NoSQL document store 104, in an embodiment. The provisioning platform 100 does away with the manual, lengthy, and burdensome provisioning process of prior approaches that relies on individualized installation and configuration of network devices.

A user such as an operator, an administrator, an authorized user, a designated user, and so forth, can use a user device 206 to enter or send a request for a listing of provisioned network devices through an application programming interface (API) or another interface provided by the provisioning platform 100, in an embodiment. The user device 206 may be operatively linked to, and communicate with, the corruption detecting platform 100 through one or more networks (e.g., 220, etc.) or via a local data connection.

Additionally, optionally or alternatively, as a part of the continuous provisioning, the provisioning specific actions automatically (e.g., fully automatically, automatically with a manual part specified or performed by a user, etc.) performed under techniques as described herein can cause system configuration data, system data, system metadata, system code, etc., to be (e.g., fully automatically, with minimal manual input, etc.) generated and deployed in connection with the affected rack (210-1-1) and/or the affected datacenter in the present example. Provisioning is continuous in that the computing system is continuously monitored, by a provision service 102, for example, for devices on the network that are non-heterogenous to the networked devices, thus needing configuration updates and/or provisioning. For example, the network may be periodically scanned for network devices that need provisioning, detecting the new network devices via discovery pings, and so forth. As used herein, system configuration data, system data, system metadata, system code, etc. refers to system-level data and/or system-level services used to store, access, or manipulate the application data for an organization in a multi-tenant architecture platform or any system of record, to enable the application services, and/or to enable networking services, etc.

In contrast with a monolithic system containing all heavy lifting potentially convoluted program logic for performing network device provisioning as under other approaches, the system configuration as illustrated in FIG. 2 provides a highly efficient, scalable, extensible infrastructure for orchestrating and performing multiple different network device provisioning, while leaving implementation details including but not limited to provisioning steps for each network device to a set of configuration objects encoded with the provisioning requirements, or functional use cases, of characteristics associated with that network device. The system configuration provides an infrastructure that can be efficiently scaled up to a relatively large number (e.g., 10,000, etc.) of network devices with (e.g., optimal, etc) minimized downtime and with no or minimal human intervention, as the datacenters and the system instances therein continue to scale up, and/or as device-specific and vendor-common configuration data is used to configure and update network devices in new racks in new datacenters, developer operation teams continue to deploy new physical devices that support new releases of products and features in the computing system. A physical device identifier store 208 may assign a unique identifier, such as a stock keeping unit (SKU) identifier to maintain an inventory of electronic devices that are included in the computing system.

3.0 Example Embodiments

Figure 3:
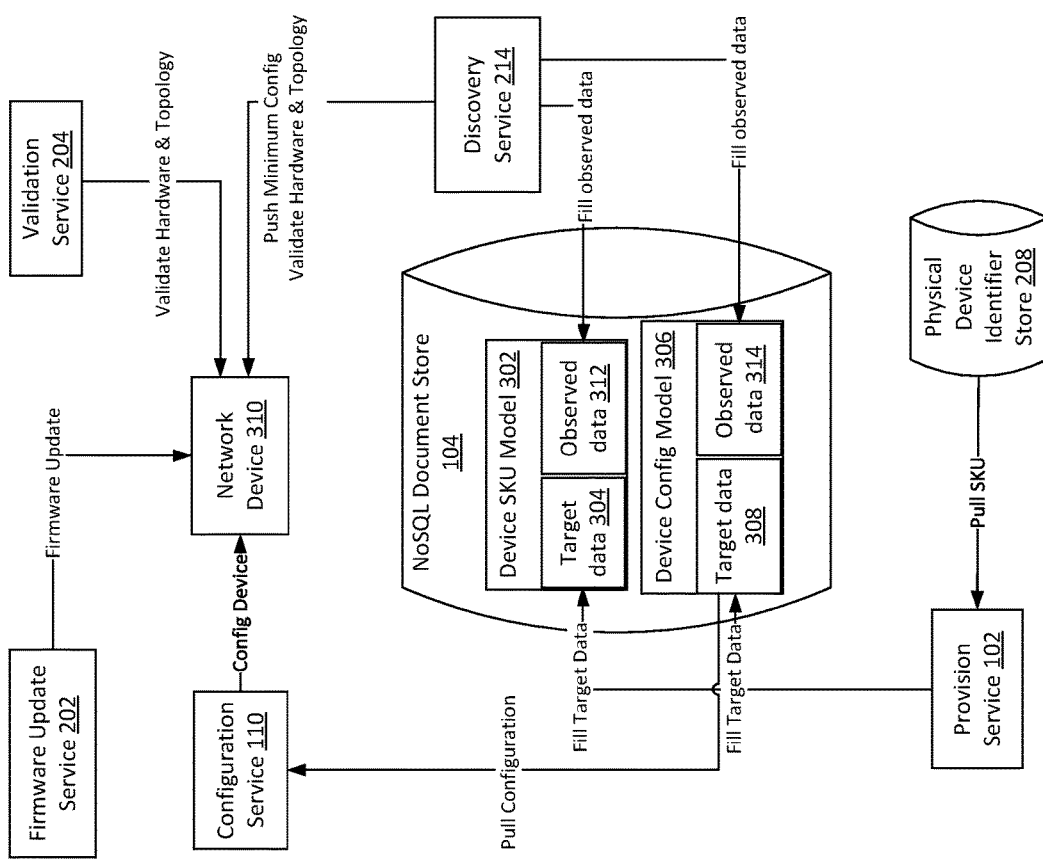
FIG. 3 illustrates an example high-level block diagram, illustrating an example process flow.

FIG. 3 illustrates an example high-level block diagram, illustrating an example process flow that may be implemented by a computing system (or device) as described herein. A NoSQL document store 104 includes a device SKU model 302 and a device config model 306. Target data 304 and 308 may be filled into the device SKU model 302 and device config model 306, respectively, by a provision service 102 that identifies a new network device 310 that needs to be installed and/or provisioned. The provision service 102 may pull the SKU from the physical device identifier store 208. Provisioning requirements for the new network device may be collected and/or obtained from various sources. Based on the uses of characteristics of the new network device, target config data 304 and 308 may be filled in. The provision service 102 may create a configuration object by using the abstract model for the new detected network device 310 (e.g., a switch) and insert the config object into the NoSQL document store 104.

An example configuration object for a switch system may include the following program instructions in a defined markup language:

```
type SwitchSystem struct {
    // AAA services Configuration.
    AAA *SwitchAAA 'Convert:"{Template.AAA},omitempty"'
    // Boot Configuration.
    Boot SwitchBootConfig 'Convert:"{Template.Boot},omitempty"'
    // Switch configuration.
    Console *SwitchConsole 'Convert:"{Template.Console},omitempty"'
    // DNS configuration.
    DNS *SwitchDNS 'Convert:"{Template.DNS},omitempty"'
    //err disable
    ErrDisable *SwitchErrDisableConfig
    'Convert:"{Template.ErrDisable},omitempty"'
    // hostname
    Hostname *ObservableString
    'Convert:"{Template.Hostname},omitempty"'
    // Switch logging configuration.
    Logging *SwitchLogging 'Convert:"{Template.Logging},omitempty"'
    // NTP configuration.
    NTP *Switch?NTP 'Convert:"{Template.NTP},omitempty"'
    // SFlow configuration.
    SFlow *SwitchSFlow 'Convert:"{Template.SFlow},omitempty"'
    // SNMP configuration.
    SNMP [ ]*SNMPConfig 'Convert:"{Template.SNMP}"'
    // TFTP configuration.
    TFTP *SwitchTFTP 'Convert:"{Template.TFTP},omitempty"'
    // Virtual routing and forwarding routing tables.
    VRFTables [ ]*SwitchVRFTable 'Convert:"{Template.VRFTables}"'
    // VTY configuration.
    VTY *SwitchVTY 'Convert:"{Template.VTY},omitempty"'
}
```

The abstract device model stored in a NoSQL database may include the following program code, for example:

```
#NetworkSwitchHardware
NetworkSwitchHardware:
    allOf:
```

-continued

```
  - $ref: '#/definitions/ManufacturerModel'
  - $ref: '#/definitions/DevicePorts'
    NetworkSwitchConfig:
      description: "Configuration of a network switch."
      type: object
      properties:
        VLANs:
          description: "Switch VLANs configuration."
          $ref: '#/definitions/SwitchVLANCollection'
        Interfaces:
          description: "Switch interfaces configuration."
          $ref: '#/definitions/SwitchInterfaceCollection'
        BGP:
          description: "Switch bgp configuration."
          $ref: '#/definitions/SwitchBGP'
        System:
          description: "Switch system-wide services and
            functions configuration."
          $ref: '#/definitions/SwitchSystem'
        ACLs:
          description: "All the ACLs defined on switch"
          type: array
          items:
            $ref: '#/definitions/SwitchACLDefinition'
    ...
```

Sample objects may include the following:

```
[
  {
    "Model": {
      "Target": "XXXXX"
    },
    "Vendor": {
      "Target": "XXXXX"
    },
    "NetworkPorts": [ ...
    ],
    "PowerPorts": [ ...
    ],
    "SerialPorts": [ ...
    ],
    "ID": "cf45286e-cd5d-41a6-bfa3-4a58c31c55e4",
    "SystemID": { ...
    },
    "Name": "XXXXXXX",
    "RackID": "8159d287-224f-4acb-98e6-fc8957f4b523",
    "RackUnit": 19,
    "SKUID": {
      "TargetID": "SKU:SWITCH:IB:18.1:XXX:XXXXXX"
    },
    "Config": {
      "ACLs": [ ],
      "BGP": {
        "Global": { ...
        },
        "Neighbors": [ ...
        ],
        "PeerGroups": [ ]
      },
      "Interfaces": [ ...
      ],
      "System": { ...
      },
      "VLANs": [ ...
      ]
    },
    "RackbotData": { ...
    }
  }
]
```

A firmware update service 202 may then attempt to update the firmware of the device 310. A firmware update is a software program that can be used to update the firmware to enhance its capabilities or fix issues. Here, the firmware update may ensure the network device firmware is up-to-date before being configured, for example. A validation service 204 may then validate the hardware and topology of the device 310. The validation service 204 may also validate the SKU as retrieved from the physical device identifier store 208.

The configuration service 110 retrieves the config object for the network device 310 and transforms the config object into a concrete configuration file for the device 310 using the designed markup language. The configuration service 110 then applies the configuration file to the device 310. A discovery service 214 then connects to the network device 310 through secure shell protocol (ssh) to compare the target config data 304 and 308 with information the discovery service 214 observes (e.g., observed data 312 and 314) to ensure the device is configured as planned. The observed data 312 and 314 is stored in the NoSQL document store 104 in the device SKU model 302 and device config model 306, respectively. Only one vendor-neutral, model neutral data model is used for all network switches, in an embodiment. Different switches configuration objects are stored at a NoSQL database, e.g., NoSQL document store 104, with the same schema.

Figure 4:
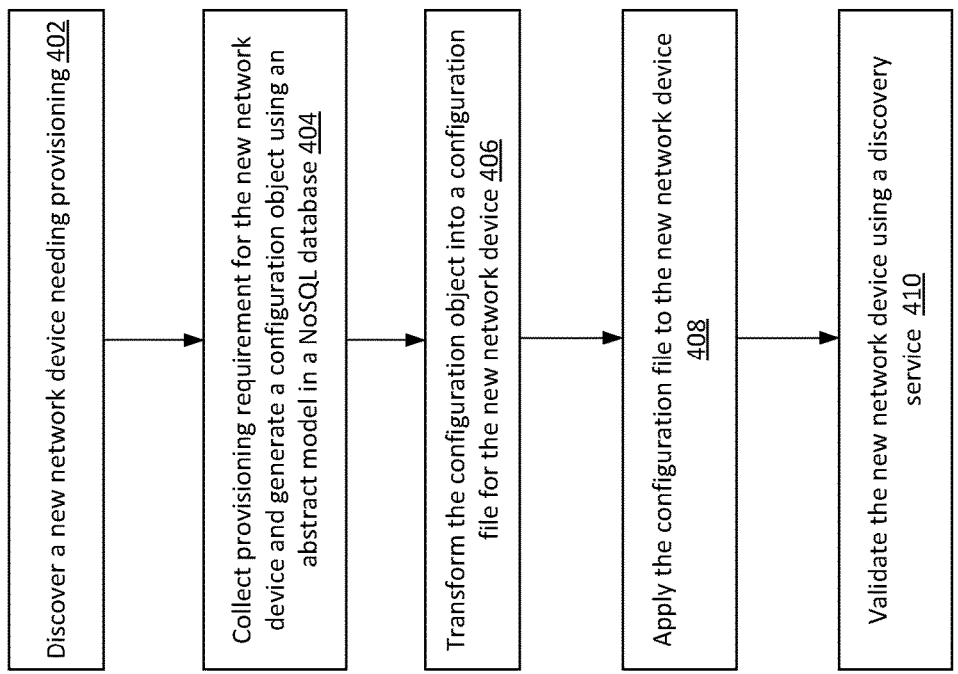
FIG. 4 illustrates an example process flow.

FIG. 4 illustrates another example process flow that may be implemented by a computing system (or device) as described herein. In block 402, a provision service 102 (e.g., 102 of FIG. 1, etc.) discovers a new network device needing provisioning. For example, the new network device may need updating, in an embodiment. As another example, the new network device may be a new model that supports faster networking speeds. In yet another example, the new network device may be an existing model that is added to support growing demands of the network infrastructure. As used herein, "new" refers to a non-heterogenous network device that is discovered by the provision service 102 or any other service.

In block 404, a provisioning requirement is collected by the provision service 102 for the new network device and a configuration object is generated using an abstract model in a NoSQL database. Provisioning requirements, or functional use cases of the network device, are encoded as program instructions to configure the network device. The encoding of the provisioning requirements is illustrated above in the example config object for a switch network device, as defined in a markup language. Some example provisioning requirements, for example, may include authentication, authorization and accounting (AAA) services, a framework for intelligently controlling access to computer resources, enforcing policies, auditing usage, and providing information to bill for services. Other example provisioning requirements include boot configuration, switch console configuration, domain name system (DNS) configuration, error handling, hostname, logging, network time protocol (NTP) configuration, sampled flow (SFlow) configuration, simple network management protocol (SNMP) configuration, trivial file transfer protocol (TFTP) configuration, virtual routing and forwarding routing tables, and virtual teletype (VTY) configuration, among others. Various algorithms and/or processes may be required of network devices, and these functional requirements may also be encoded as program instructions.

In block 406, the configuration object is transformed into a configuration file for the new network device. Using the markup language, the configuration service 110 is able to transform the configuration object into a configuration file that may be applied to the new network device based on the vendor and model. The SKU of the new network device may inform the configuration service 110 on how to correctly transform the configuration object, in an embodiment. In another embodiment, the generated configuration object, through the markup language, may include instructions on how to correctly transform the configuration object into a concrete configuration file for the network device.

In block 408, the configuration file is applied to the new network device. The configuration file may be applied to the network device by transferring the file to the device from the configuration service 110.

In block 410, the new network device is validated using a discovery service 214. The discovery service 214 connects to the network device and compares the target config data stored in the NoSQL document store 104 with observed data at the network device to ensure the device is configured as planned.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
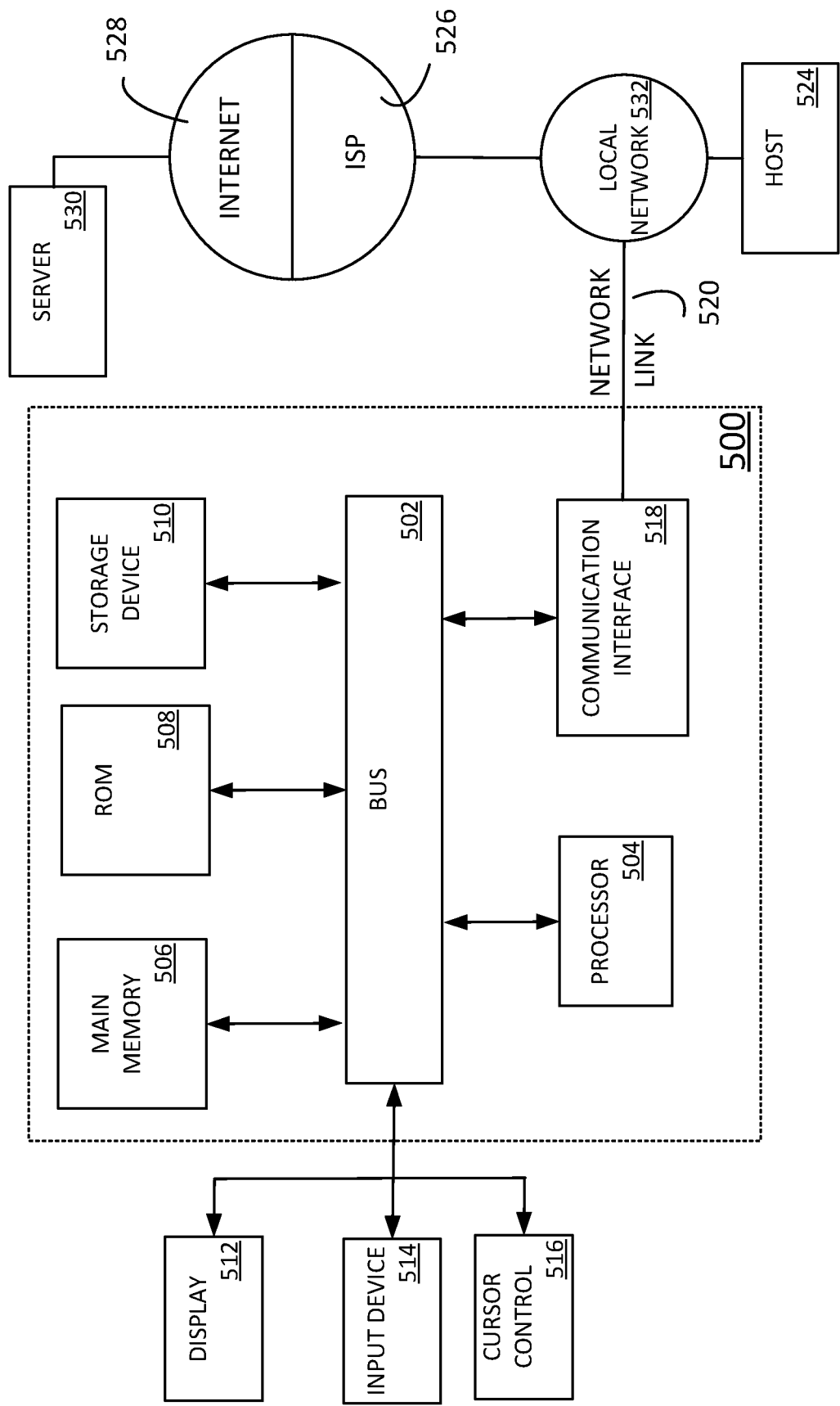
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
  periodically scanning for network devices that are non-heterogeneous to other networked devices in a plurality of network devices;
  identifying a non-heterogeneous network device in the plurality of network devices;
  retrieving a vendor-neutral configuration template from a non-relational database based on a device type of the non-heterogeneous network device, wherein the non-relational database includes a plurality of vendor-neutral configuration templates for different types of network devices, wherein one vendor-neutral configuration template is used for each type of network device, wherein vendor-neutral configuration templates include target configuration instructions, wherein the target configuration instructions are generated from encoding provisioning requirements collected from different data sources for a plurality of target network devices;
  generating a configuration file in a format associated with the non-heterogeneous network device based on one or more target configuration instructions from the vendor-neutral configuration template associated with at least one characteristic of the non-heterogeneous network device and a vendor of the non-heterogeneous network device;
  causing the non-heterogeneous network device to update a configuration of the non-heterogeneous network device by applying the configuration file;
  validating the configuration of the non-heterogeneous network device by comparing network configuration data retrieved from the non-heterogeneous network device to the plurality of target configuration instructions.

2. The method as recited in claim 1, wherein the configuration file is generated based on interpreting the one or more target configuration instructions expressed in a defined markup language.

3. The method as recited in claim 1, wherein the non-heterogeneous network device comprises a switch.

4. The method as recited in claim 1, wherein the non-heterogeneous network device comprises a router.

5. The method as recited in claim 1, wherein the non-heterogeneous network device receives a firmware update after detection of the non-heterogeneous network device.

6. The method as recited in claim 1, further comprising:
  retrieving a stock keeping unit (SKU) identifier of the non-heterogeneous network device, wherein the SKU identifier of the non-heterogeneous network device is associated with the at least one characteristic.

7. The method as recited in claim 1, wherein the validating the configuration of the non-heterogeneous network device further comprises:
  connecting to the non-heterogeneous network device through a secure shell (ssh) protocol to retrieve the network configuration data.

8. One or more non-transitory computer-readable storage media, storing one or more sequences of instructions, which when executed by one or more processors cause performance of:
  periodically scanning for network devices that are non-heterogeneous to other networked devices in a plurality of network devices;

identifying a non-heterogeneous network device in the plurality of network devices;

retrieving a vendor-neutral configuration template from a non-relational database based on a device type of the non-heterogeneous network device, wherein the non-relational database includes a plurality of vendor-neutral configuration templates for different types of network devices, wherein one vendor-neutral configuration template is used for each type of network device, wherein vendor-neutral configuration templates include target configuration instructions, wherein the target configuration instructions are generated from encoding provisioning requirements collected from different data sources for a plurality of target network devices;

generating a configuration file in a format associated with the non-heterogeneous network device based on one or more target configuration instructions from the vendor-neutral configuration template associated with at least one characteristic of the non-heterogeneous network device and a vendor of the non-heterogeneous network device;

causing the non-heterogeneous network device to update a configuration of the non-heterogeneous network device by applying the configuration file;

validating the configuration of the non-heterogeneous network device by comparing network configuration data retrieved from the non-heterogeneous network device to the plurality of target configuration instructions.

9. The one or more non-transitory computer-readable storage media of claim 8, wherein the configuration file is generated based on interpreting the one or more target configuration instructions expressed in a defined markup language.

10. The one or more non-transitory computer-readable storage media of claim 8, wherein the non-heterogeneous network device comprises a switch.

11. The one or more non-transitory computer-readable storage media of claim 8, wherein the non-heterogeneous network device comprises a router.

12. The one or more non-transitory computer-readable storage media of claim 8, wherein the non-heterogeneous network device receives a firmware update after detection of the non-heterogeneous network device.

13. The one or more non-transitory computer-readable storage media of claim 8, wherein the sequences of instructions, which when executed by the one or more processors cause further performance of:

retrieving a stock keeping unit (SKU) identifier of the non-heterogeneous network device, wherein the SKU identifier of the non-heterogeneous network device is associated with the at least one characteristic.

14. The one or more non-transitory computer-readable storage media of claim 8, wherein the validating the configuration of the non-heterogeneous network device further comprises:

connecting to the non-heterogeneous network device through a secure shell (ssh) protocol to retrieve the network configuration data.

15. A system, comprising:

one or more processors; a memory storing instructions, which when executed by the one or more processors, cause the one or more processors to perform:

periodically scanning for network devices that are non-heterogeneous to other networked devices in a plurality of network devices;

identifying a non-heterogeneous network device in the plurality of network devices;

retrieving a vendor-neutral configuration template from a non-relational database based on a device type of the non-heterogeneous network device, wherein the non-relational database includes a plurality of vendor-neutral configuration templates for different types of network devices, wherein one vendor-neutral configuration template is used for each type of network device, wherein vendor-neutral configuration templates include target configuration instructions, wherein the target configuration instructions are generated from encoding provisioning requirements collected from different data sources for a plurality of target network devices;

generating a configuration file in a format associated with the non-heterogeneous network device based on one or more target configuration instructions from the vendor-neutral configuration template associated with at least one characteristic of the non-heterogeneous network device and a vendor of the non-heterogeneous network device;

causing the non-heterogeneous network device to update a configuration of the non-heterogeneous network device by applying the configuration file;

validating the configuration of the non-heterogeneous network device by comparing network configuration data retrieved from the non-heterogeneous network device to the plurality of target configuration instructions.

16. The system as recited in claim 15, wherein the configuration file is generated based on interpreting the one or more target configuration instructions expressed in a defined markup language.

17. The system as recited in claim 15, wherein the non-heterogeneous network device comprises a switch.

18. The system as recited in claim 15, wherein the non-heterogeneous network device comprises a router.

19. The system as recited in claim 15, wherein the instructions, which when executed by the one or more processors, cause the one or more processors to further perform:

retrieving a stock keeping unit (SKU) identifier of the non-heterogeneous network device, wherein the SKU identifier of the non-heterogeneous network device is associated with the at least one characteristic.

20. The system as recited in claim 15, wherein the validating the configuration of the non-heterogeneous network device further comprises:

connecting to the non-heterogeneous network device through a secure shell (ssh) protocol to retrieve the network configuration data.

* * * * *